United States Patent Office 3,555,897
Patented Jan. 19, 1971

3,555,897
LANDING APPROACH AIDS
George Robin Sleight, Coxheath, near Maidstone, Kent,
England, assignor to Elliott Brothers (London) Limited,
London, England, a British company
Filed June 27, 1969, Ser. No. 837,170
Claims priority, application Great Britain, June 29, 1968,
31,189/68
Int. Cl. G01c 21/06
U.S. Cl. 73—178                            2 Claims

ABSTRACT OF THE DISCLOSURE

The invention relates to an airborne landing approach aid for an aircraft in which a symbol parallel to and depressed with respect to the horizon is presented on a head-up display. When the aircraft is remote from the touchdown point of a runway the line is depressed by the glide scope angle, normally 3°, with respect to the horizon. To allow for errors introduced by the distance between the pilot and the main landing gear of the aircraft the angle of depression of the symbol varies with distance from the touchdown point of the runway so that it is the landing gear, and not the pilot's eyes, which track down the glide scope.

---

This invention relates to a landing approach aid for aircraft.

It has been suggested that the simple display, on a head-up display, of a horizon line depressed by the angle of the desired glide slope from the horizontal should form a useful approach aid for aircraft when performing a landing manoeuvre.

The primary virtue of such a system is that it does not depend on the availability or correct functioning of an I.L.S. system.

Although the feasibility of such a scheme has been demonstrated by the Blind Landing Experimental Unit at Bedford, the latter scheme has certain limitations.

Firstly, with a large pilot's eye to landing wheel distance a considerable inaccuracy can occur during a landing approach, between the projected flight path as seen by the pilot and the flight path as experienced by the main wheels. If the pilot tries to hold a depressed horizon line without correction on the desired touchdown point then the main wheels would touch the runway well short of the point. Secondly, the touchdown point (glide slope origin) is not well defined at all airfields and a pilot may well have trouble in holding the depressed sight line on an ill-defined point.

This invention is concerned with a system to display accurately positioned touchdown zone and threshold markers which are corrected for the errors due to pilot displacement from the main wheels.

According to the invention a landing approah aid for an aircraft comprises:

a head-up display
means operable to develop a signal representing pitch attitude of the aircraft;
means operable to develop a signal representing aircraft altitude;
means operable to develop constant signals defining the location of the main landing gear of the aircraft with respect to the pilot;
means operable to develop a constant signal representing a desired glide slope angle; and
circuitry responsive to the signals from the various means referred to above so as to develop an output signal operable to control the position of a target marker symbol on the head-up display so that the pilot by flying the the aircraft to maintain the symbol in coincidence with a desired point on a runway corresponding to the origin of the slide slope, ensures that it is the aircraft's main landing gear (and not the pilot's eye) which tracks along the glide slope.

The landing approach aid may include means operable to develop a signal defining the location of the runway threshold with respect to the glide slope origin; and circuitry responsive to the signals from the latter means and to the various means referred to in the least preceding paragraph so as to develop an output signal operable to control the display so as to produce on the display, a symbol which coincides with the runway threshold.

The invention is hereinafter described with reference to the accompanying drawings, in which.

Figure 1:
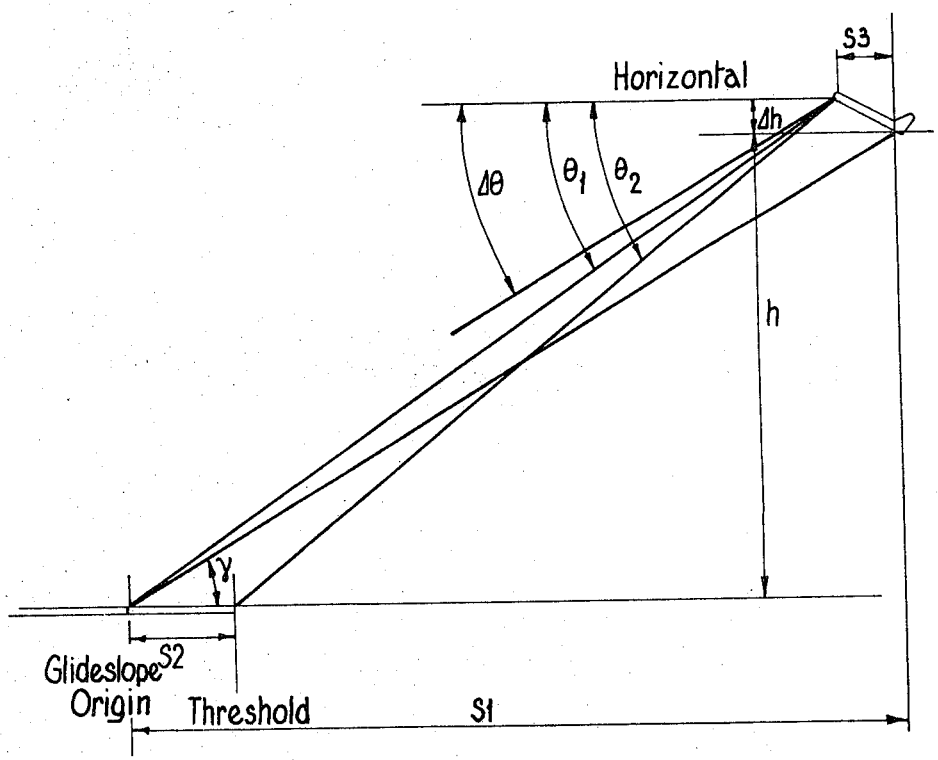
FIG. 1 is a diagram, grossly distored as to angles and dimensions, illustrating certain essential features of the invention.

Referring to FIG. 1, if the landing approach is to be made along a glide slope having an angle $\gamma$ and a display is derived from an attitude reference and depressed by an angle $\Delta\theta$ below the horizontal, then if $\Delta\theta=\gamma$ and if the aircraft is small and on the correct slide slope, than the projected position of the line $\Delta\theta$ will lie on the glide slope origin.

By displaying a depressed horizon line, i.e. a horizontal line depressed below the horizon by an angle equal to the desired approach path angle then, neglecting the effect of aircraft dimensions, the pilot can monitor his approach by the relation between the depressed horizon and the touchdown point. Additionally, at an early stage in the approach, say as seen from a position on the glide slope well above 2,000 ft., the position of the runway threshold and touchdown points are effectively coincident.

If now we consider the effect of aircraft dimensions then, referring to FIG. 1 and assuming the aicraft to be flying along a course vertically above the runway centre line, the wheel distance to touchdown is:

$$S_1=\frac{57.3h}{\gamma} \text{ (1 radian}=57.3°\text{)}$$

where $h$ is the altitude of the aircraft's main landing wheels.

Pilot eye distance to touchdown is: $S_1-S_3$, where $S_3$ is the distance in the horizontal direction between the pilot of the main landing wheels for a prescribed aircraft pitch attitude $\theta$.

Pilot eye height is: $h+\Delta h$, where $\Delta h$ is the vertical distance between the pilot's eyes and the main landing wheels for the prescribed pitch attitude $\theta$.

From the above:

$$\frac{h+\Delta h}{S_1-S_2}=\frac{\theta_1}{57.3}$$

where $\theta_1$ is the angle between the runway centre line and a line drawn from the pilot's eyes to the glide slope origin.

If $\gamma=3°$ then $$\theta_1=3\times\left(\frac{h+\Delta h}{h-\frac{S_3}{19.1}}\right)$$

Similarly:
where $\theta_2$ is the angled subtended between the centre line $$\theta_2 = 3 \times \left( \frac{h + \Delta h}{h - \frac{S_3 + S_2}{19.1}} \right)$$

of the runway and a line drawn from the pilot's eyes to the runway threshold.

Assuming $S_2$ to be the agreed ICAO standard, 1,000 ft., and, as typical values for $\Delta h$ and $S_3$, we assume the values 40 ft. and 100 ft. respectively then:

$$\theta_1 = 3 \times \left( \frac{h+40}{h-5.2} \right) \text{ and } \theta_2 = 3 \times \left( \frac{h+40}{h-57} \right)$$

Clearly, as $h$ tends to infinity then $\theta_1$ and $\theta_2$ tend to 3°.

Figure 2:
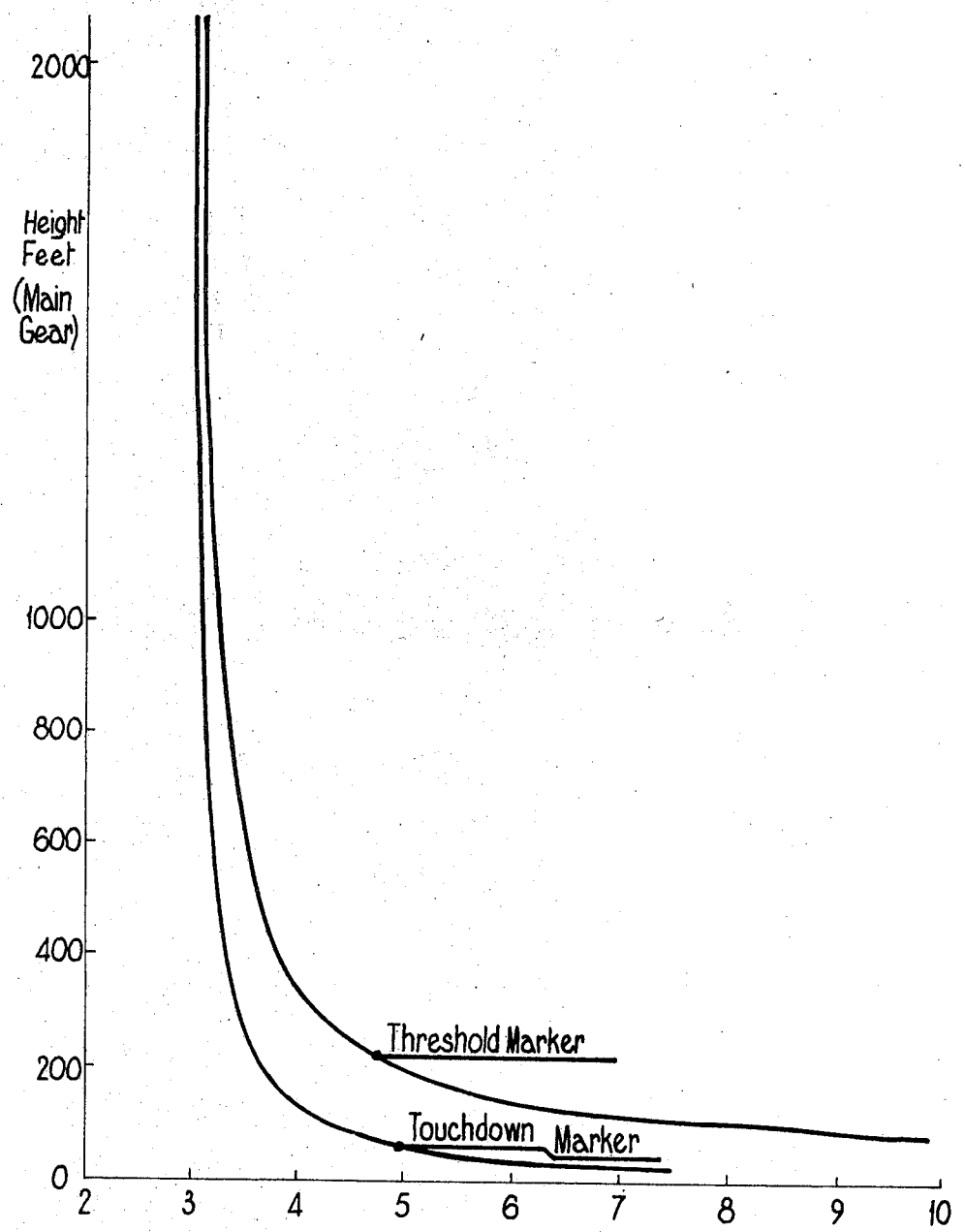
FIG. 2 is a graph showing the variation from a nominal three degree slide slope with approach to touchdown.

Otherwise expressed at a high altitude on the approach, the error due to displacements of the pilot's eye from the main wheels is negligible. Below about 1,000 ft., however, the error becomes significant. FIG. 2 shows the values of $\theta_1$ and $\theta_2$ plotted against height in order to ensure that the main wheels track along a 3° glide slope (for a particular case $\Delta h = 40$ ft. and $S_3 = 100$ ft.).

As can be seen, even the depressed touchdown line actually requires to be depressed by 3.7° rather than 3° at 200 ft. to maintain the aircraft wheels on the correct path. If this correction is not applied to the depression angle then there is a danger that the pilot may push the aircraft nose down to maintain an uncorrected 3° line at the touchdown point and the aircraft would then land short of the touchdown correct point and with a higher rate of descent.

The values for $\Delta h$ (40 ft.) and $S_3$ (100 ft.) employed in the above equations approximate to those for Concorde aircraft.

In the latter aircraft the eye to ground height with aircraft nose wheel on the ground is 27 ft. and the cockpit is 100 ft. ahead of the rearmost main gear. Assuming, for Concorde, a pitch attitude of 12° on approach to land then, using the nomenclature of FIG. 2:

$$\Delta h = 27 + \left( 100 \times \frac{12}{57.1} \right) = 47 \text{ ft.}$$

$$S_3 = 100 - \left( 27 \times \frac{12}{57.1} \right) = 96 \text{ ft.}$$

From the above it will be seen that the figures in the equations are not unrepresentative of large aircraft currently under development.

Figure 3:
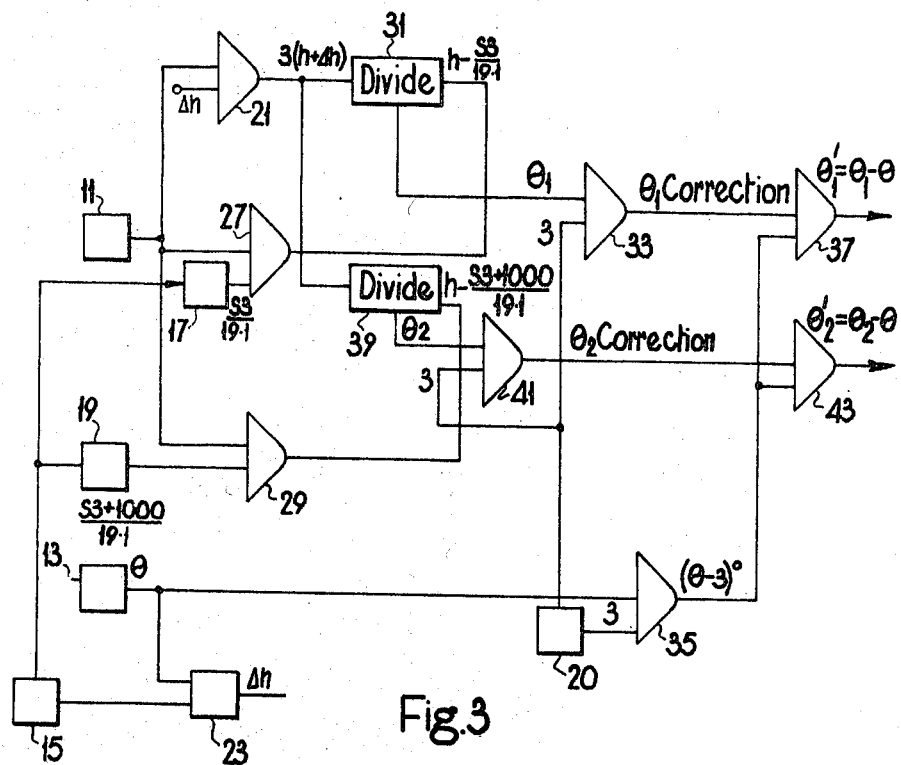
FIG. 3 is a schematic diagram showing an implementation of the invention.

Referring to FIG. 3 it will be seen that the signals $\theta_1$ and $\theta_2$ for controlling the depressed horizon and runway threshold markers, respectively, of the head-up display (FIG. 4) are derived from a radio altimeter 11, a vertical reference unit 13, a signal source 15 which is operable to develop a signal representing the constant $S_3$, means 17 operable to develop from the signal $S_3$ a constant signal $$\frac{S_3}{19.1}$$

a signal source 19 operable to develop from the signal $S_3$ a signal representing the constant $$\frac{S_3 + K}{19.1}$$

specifically the constant $$\frac{S_3 + 1,000}{19.1}$$

and an amplifier 21 having a gain $\gamma$ specifically $\gamma = 3°$, the guide slope angle.

The vertical reference 13 develops an output signal $\theta$ which is applied to a multiplier 23 which also receives a signal $S_3$ from the source 15 and from these signals produces an output signal representing the parameter $\Delta h$.

The output signal $\Delta h$ from the multiplier 23 is applied to one input of the amplifier 21 which receives, at a second input, a signal $h$ from the radio altimeter 11 and in response to these signals develops an output signal $\gamma(h+\Delta h)$, specifically the signal $3(h+ h)$. The signal $h$ from the altimeter 11 is also applied to signal subtracting devices (summing amplifiers 27 and 29) which receive the constant signals $$\frac{S_3}{19.1} \text{ and } \frac{S_3 + 1,000}{19.1}$$

respectively. The device 27 develops an output signal $$h - \frac{S_3}{19.1}$$

the device 29 develops an output signal $$h - \frac{(S_3 + 1,000)}{19.1}$$

The output signal $3(h+\Delta h)$ from the amplifier 21 is applied to a divider 31 which also receives a signal from the subtractor 27 and develops the output signal $\theta_1$.

The output signal $\theta_1$ from the divider and a signal $\gamma(=3°)$ from a source 20 are applied to a substractor 33 which develops an output signal $\theta_{1\text{ correction}}$, i.e. $(\theta_1 - 3)°$.

The signal $\gamma(=3°)$ from the source 20 is applied to a subtractor 35 which also receives a signal $\theta$ from the vertical reference 13 and from these signals produces an output signal $(\theta - 3)°$. The latter signal is applied, together with a signal $\theta_{1\text{ correction}}$, to a further subtractor 37 which, develops the output signal $\theta_1'$ ($= \theta_1 - \theta$).

In like manner the output signal $(3(h+\Delta h)$ from the amplifier 21 to a second divider 39 to which is also applied the signal $$h - \frac{(S_3 + 1,000)}{19.1}$$

developed by the summing amplifier 29.

Figure 4:
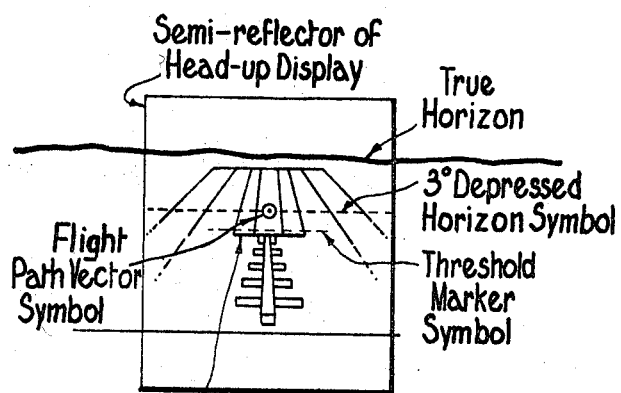
FIG. 4 is a diagram showing runway and symbols which, in accordance with the invention, may be displayed on the head-up display.

In response to the signals the divider 39 develops the output signal $\theta_2$. The latter signal is applied to a subtractor 41 which receives the signal $\gamma(=3°)$ from the source 20 and develops the output signal $\theta_{\text{correction}}$ i.e. $(R_2-3)°$. The latter signal is applied, together with a signal $(\theta-3)°$ from the subtractor 35 to a further subtractor 43 which, in response, develops the signal $\theta_2' = \theta_2 - \theta$. Signals $\theta_1'$ and $\theta_2'$ are employed to control the position, on the display, of the depressed horizon line and the threshold marker symbol, respectively (FIG. 4).

In the latter figure, in addition to the symbols representing the true and depressed horizons and the threshold marker, there is a flight path vector symbol. When the aircraft is not on the glide slope or has an undesired attitude, the latter symbols is displaced with respect to the depressed horizon symbol; the pilot's task is to manoeuvre the aircraft so as to bring about the alignment of symbols, as illustrated.

The latter symbols are formed by a waveform generator (not shown) of the display in response to the signals $\theta_1'$ and $\theta_2'$ from the subtractors 37 and 43 respectively. The depressed horizon and threshold marker symbols are formed on the target of a cathode ray tube of the head-up display by a discrete line writing (as distinct from brightup of appropriate segments of a television type raster) on the target. The cathode ray tube beam deflection circuitry (not shown) for producing symbols on the target of the cathode ray tube, may be of a conventional character and, accordingly, is not discussed here.

I claim:
1. A landing approach aid for an aircraft which comprises:
  a head-up display;
  means operable to develop a signal representing pitch attitude of the aircraft;
  means operable to develop a signal representing aircraft altitude;
  means operable to develop constant signals defining the location of the main landing gear of the aircraft with respect to the pilot;

means operable to develop a constant signal representing a desired glide slope angle; and circuitry responsive to the signals from the various means referred to above so as to develop an output signal operable to control the position of a target marker symbol on the head-up display so that the pilot by flying the aircraft to maintain the symbol in coincidence with a desired point of a runway corresponding to the origin of the glide slope, ensures that it is the aircraft's main landing gear (and not the pilot's eye) which tracks along the guide slope.

2. A landing approach aid according to claim 1 and including means operable to develop a signal defining the location of the runway threshold with respect to the glide slope origin; and circuitry responsive to the signals from the latter means and to the means referred to in claim 1 so as to develop an output signal operable to control the display so as to produce on the display, a symbol which coincides with the runway threshold.

References Cited
UNITED STATES PATENTS 3,355,941   12/1967   Birmingham _____ 73—178

DONALD O. WOODIEL, Primary Examiner